United States Patent
Jeong et al.

(10) Patent No.: US 9,792,560 B2
(45) Date of Patent: Oct. 17, 2017

(54) TRAINING SYSTEMS AND METHODS FOR SEQUENCE TAGGERS

(71) Applicant: Microsoft Technology Licensing, LLC, Redmond, WA (US)

(72) Inventors: Minwoo Jeong, Sammamish, WA (US); Young-Bum Kim, Fairview, WA (US); Ruhi Sarikaya, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 308 days.

(21) Appl. No.: 14/623,846

(22) Filed: Feb. 17, 2015

(65) Prior Publication Data

US 2016/0239758 A1 Aug. 18, 2016

(51) Int. Cl.
*G06F 15/18* (2006.01)
*G06N 99/00* (2010.01)
*G06F 17/30* (2006.01)
*G06N 7/00* (2006.01)
*G06F 17/27* (2006.01)

(52) U.S. Cl.
CPC ....... *G06N 99/005* (2013.01); *G06F 17/2705* (2013.01); *G06F 17/2785* (2013.01); *G06F 17/30864* (2013.01); *G06N 7/005* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 7,610,191 B2* | 10/2009 | Gao | ...................... | G06F 17/271 704/257 |
| 7,996,211 B2* | 8/2011 | Gao | ...................... | G06F 17/271 704/10 |
| 8,250,015 B2 | 8/2012 | Li et al. | | |
| 8,407,214 B2 | 3/2013 | Li et al. | | |
| 8,566,078 B2* | 10/2013 | Sarikaya | .................. | A63F 9/24 704/2 |

(Continued)

OTHER PUBLICATIONS

Direct sub-word confidence estimation with hidden-state conditional random fields M. S. Seigel; P. C. Woodland 2014 IEEE International Conference on Acoustics, Speech and Signal Processing (ICASSP) Year: 2014 pp. 2307-2311, DOI: 10.1109/ICASSP.2014.6854011 IEEE Conference Publications.*

(Continued)

*Primary Examiner* — Michael B Holmes

(57) ABSTRACT

Systems and methods for or training as sequence tagger, such as conditional random field model. More specifically, the systems and methods train a sequence tagger utilizing partially labeled data from crowd-sourced data for a specific application and partially labeled data from search logs. Further, the systems and methods disclosed herein train a sequence tagger utilizing only partially labeled by utilizing a constrained lattice where each input value within the constrained lattice can have multiple candidate tags with confidence scores. Accordingly, the systems and methods provide for a more accurate sequence tagging system, a more reliable sequence tagging system, and a more efficient sequence tagging system in comparison to sequence taggers trained utilizing at least some fully-labeled training data.

20 Claims, 9 Drawing Sheets

(56) References Cited

U.S. PATENT DOCUMENTS

| | | | | |
|---|---|---|---|---|
| 8,798,962 | B2* | 8/2014 | Bose | G06F 11/3024 |
| | | | | 702/186 |
| 9,098,494 | B2* | 8/2015 | Sarikaya | G06F 17/289 |
| 9,292,492 | B2* | 3/2016 | Sarikaya | G06F 17/30672 |
| 9,311,298 | B2* | 4/2016 | Sarikaya | G10L 15/18 |
| 9,318,109 | B2* | 4/2016 | Boies | G10L 15/1815 |
| 9,367,526 | B1* | 6/2016 | Vozila | G06Q 10/107 |
| 9,412,363 | B2* | 8/2016 | Sarikaya | G10L 15/1815 |
| 9,466,297 | B2* | 10/2016 | Crook | G10L 15/183 |
| 9,519,870 | B2* | 12/2016 | Sarikaya | G06N 99/005 |
| 9,589,565 | B2* | 3/2017 | Boies | G10L 17/22 |
| 9,596,663 | B2* | 3/2017 | Choi | H04L 25/0204 |
| 9,646,001 | B2* | 5/2017 | Sarikaya | G06F 17/289 |
| 9,690,776 | B2* | 6/2017 | Sarikaya | G06F 17/2785 |
| 9,697,200 | B2* | 7/2017 | Sarikaya | G10L 15/18 |
| 2004/0205482 | A1 | 10/2004 | Basu et al. | |
| 2007/0255689 | A1 | 11/2007 | Sun et al. | |
| 2009/0063145 | A1 | 3/2009 | Hakkani-Tur et al. | |
| 2010/0268725 | A1 | 10/2010 | Wang et al. | |
| 2012/0143790 | A1 | 6/2012 | Wang et al. | |
| 2012/0290293 | A1 | 11/2012 | Hakkani-Tur et al. | |
| 2014/0236575 | A1 | 8/2014 | Tur et al. | |

OTHER PUBLICATIONS

An annotated corpus for extracting the phenotypic plasticity and the association of SNP-Phenotypes from the text Behrouz Bokharaeian; Alberto Diaz 2016 2nd International Conference of Signal Processing and Intelligent Systems (ICSPIS) Year: 2016 pp. 1-6, DOI: 10.1109/ICSPIS.2016.7869852 IEEE Conference Publications.*

Uniterm Voice Indexing and Search for Mobile Devices Changxue Ma 2008 Proceedings of 17th International Conference on Computer Communications and Networks Year: 2008 pp. 1-6, DOI: 10.1109/ICCCN.2008.ECP.156 IEEE Conference Publications.*

Quality estimation for asr k-best list rescoring in spoken language translation Raymond W. M. Ng; Kashif Shah; Wilker Aziz; Lucia Specia; Thomas Hain 2015 IEEE International Conference on Acoustics, Speech and Signal Processing (ICASSP) Year: 2015 pp. 5226-5230, DOI: 10.1109/ICASSP.2015.7178968 IEEE Conference Publications.*

Application of CRF and SVM based semi-supervised learning for semantic labeling of environments Lei Shi; Rami Khushaba; Sarath Kodagoda; Gamini Dissanayake 2012 12th International Conference on Control Automation Robotics & Vision (ICARCV) Year: 2012 pp. 835-840, DOI: 10.1109/ICARCV.2012.6485266 IEEE Conference Publications.*

Laser and Vision Based Outdoor Object Mapping Oliver Brock; Jeff Trinkle; Fabio Ramos Robotics:Science and Systems IV Year: 2009 pp. 9-16 MIT Press eBook Chapters.*

Matching Criteria for Vocabulary-Independent Search Upendra V. Chaudhari; Michael Picheny IEEE Transactions on Audio, Speech, and Language Processing Year: 2012, vol. 20, Issue: 5 pp. 1633-1643, DOI: 10.1109/TASL.2012.2186805 IEEE Journals & Magazines.*

Xu, et al., "Named Entity Mining from Click-Through Data Using Weakly Supervised Latent Dirichlet Allocation", In Proceedings of the 15th ACM SIGKDD International Conference on Knowledge Discovery and Data Mining, Jun. 28, 2009, 9 pages.

Szummer, Marlin Olof, "Learning from Partially Labeled Data", In Theses of Doctor of Philosophy, Sep. 2002, 81 pages.

Chen, et al., "Improving Context-Aware Query Classification via Adaptive Self-training", In Proceedings of the 20th ACM International Conference on Information and Knowledge Management, Oct. 24, 2011, 9 pages.

Kim, et al., "Incremental Learning to Rank with Partially-Labeled Data", In Proceedings of the Workshop on Web Search Click Data, Feb. 9, 2009, 8 pages.

Celikyilmaz, et al., "Leveraging Web Query Logs to Learn User Intent Via Bayesian Discrete Latent Variable Model", In Proceedings of the 28th International Conference on Machine Learning, Jul. 2, 2011, 6 pages.

Li, et al., "Learning query intent from regularized click graphs", In Proceedings of the 31st Annual International ACM SIGIR Conference on Research and Development in Information Retrieval, Jul. 20, 2008, 8 pages.

Li, et al., "Extracting Structured Information from User Queries with Semi-Supervised Conditional Random Fields", In Proceedings of the 32nd International ACM SIGIR Conference on Research and Development in Information Retrieval, Jul. 19, 2009, 8 pages.

International Search Report in Application PCT/US2016/016245, dated May 11, 2016, 16 pages.

Tackstrom et al., "Token and Type Constraints for Cross-Lingual Part-of-Speech Tagging", Transactions of the Association for Computational Linguistics, vol. 1, No. 1, Mar. 1, 2013, 12 pages.

Ganchev et al., "Using Search-Logs to Improve Query Tagging", Proceedings of the 50th Annual Meeting of the Association for Computational Linguistics, Short Papers, Jul. 8, 2012, 4 pages.

PCT Second Written Opinion in PCT/US2016/016245, dated Feb. 9, 2017, 11 pages.

Young-Bum Kim et al., "Weakly Supervised Slot Tagging with Partially Labeled Sequences from Web Search Click Logs", Proceedings of the 2015 Conference of the North American Chapter of the Association for Computational Linguistics: Human Language Technologies, May 31, 2015, pp. 84-92.

"International Preliminary Report on Patentability Issued in PCT Application No. PCT/US2016/016245", dated: May 23, 2017, 12 Pages.

\* cited by examiner

TRAINING SYSTEMS AND METHODS FOR SEQUENCE TAGGERS

BACKGROUND

Machine learning, language understanding, and artificial intelligence are changing the way users interact with the computers. Developers of computers and application are always trying to improve the interactions between humans and computers. However, development of language understanding models often requires a significant amount of time, money, and other resources to accomplish.

It is with respect to these and other general considerations that embodiments disclosed herein have been made. Also, although relatively specific problems may be discussed, it should be understood that the embodiments should not be limited to solving the specific problems identified in the background or elsewhere in this disclosure.

SUMMARY

In summary, the disclosure generally relates to systems and methods for training as sequence tagger, such as conditional random field model. More specifically, the systems and methods disclosed herein train a sequence tagger utilizing partially labeled data from crowd-sourced data for a specific application and partially labeled data from search logs. The systems and methods disclosed herein train a sequence tagger utilizing only partially labeled by merging the partially labeled data into a constrained lattice where each input value within the constrained lattice can have multiple candidate tags with confidence scores. Accordingly, the systems and methods disclosed herein for training a sequence tagger provide for a more accurate sequence tagging system, a more reliable sequence tagging system, and a more efficient sequence tagging system. Further, the systems and methods described herein for training a sequence tagger by utilizing only partially labeled data for a specific application and partially labeled data from search logs reduces the time and resources necessary to build a language understanding model for an application.

One aspect of the disclosure is directed to a method for training a sequence tagger utilizing machine learning techniques. The method includes obtaining partially labeled data from a first source for a specific application and obtaining partially labeled data from a second source. The second source is search logs. The method further includes merging the partially labeled data from the first source and from the search logs into a constrained lattice. Each input value within the constrained lattice has a plurality of candidate tags with confidence scores. The method additionally includes running a training algorithm based on the constrained lattice to estimate model parameters. The method provides for a more accurate sequence tagger and a more reliable sequence tagger in comparison to sequence taggers that are trained with at least some fully-labeled data.

Another aspect of the disclosure includes a training system for a conditional random field. The training system comprises a computing device. The computing device includes a processing unit and a memory. The processing unit implements a constrained lattice system. The constrained lattice system is operable to obtain partially labeled data from crowd-sourced data for a specific application and to obtain partially labeled data from search logs. The constrained lattice system is further operable to merge the partially labeled data from the crowd-sourced data and from the search logs into a constrained lattice. Each word within the constrained lattice has a plurality of candidate tags with confidence scores. Additionally, the constrained lattice system is operable to run a training algorithm based on the constrained lattice to estimate model parameters.

Yet another aspect of the disclosure includes a system for building a language understanding model utilizing machine learning techniques. The system comprises at least one processor and one or more computer-readable storage media including computer-executable instructions stored thereon. The computer-executable instructions are executed by the at least one processor. The computer-executable instructions cause the system to perform operations including obtaining partially labeled data from crowd-sourced data for a specific application and obtaining partially labeled data from search logs. The computer-executable instructions further cause the system to perform operations including merging the partially labeled data from the crowd-sourced data and from the search logs into a constrained lattice. Each word within the constrained lattice has a plurality of candidate tags with confidence scores. The constrained lattice is constrained because every word has a set of allowed candidate tag types and because the plurality of candidate tags is structured. Additionally, the computer-executable instructions cause the system to perform operations including running a training algorithm based on the constrained lattice to estimate model parameters. The language understanding model is a trained conditional random field.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1:
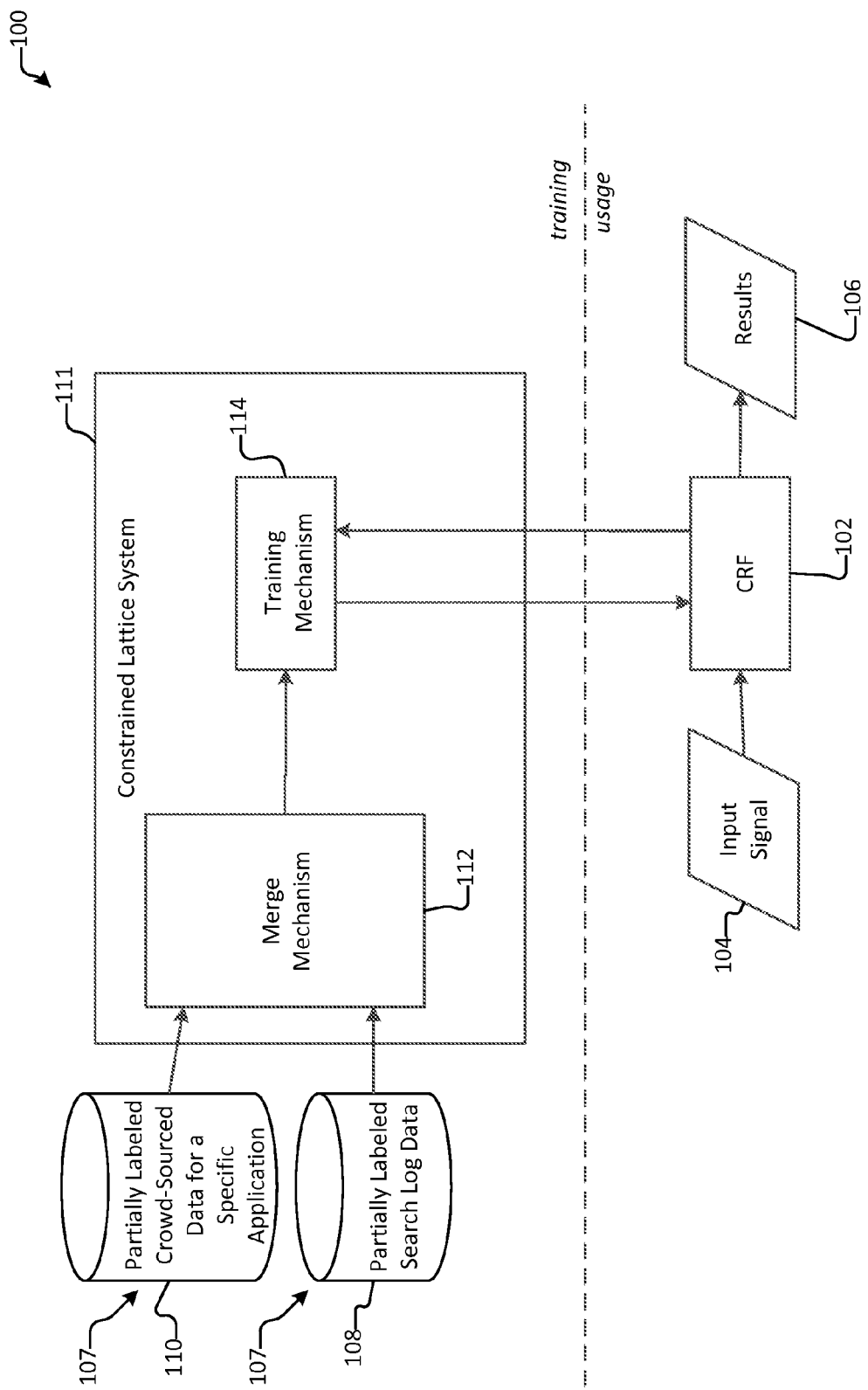
FIG. 1 is a block diagram illustrating an example of a system for training a sequence tagger.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with the computers. Digital assistant applications, such as Ski, Google Now and Cortana are examples of the shift in human computer interaction. However, currently, it is extremely difficult and/or resource intensive for developers outside of the companies that created these digital applications to build language understanding experiences within these already created digital assistant applications for their own applications. In other words, the 3rd party extensibility of these digital assistant applications is often resource prohibitive. For example, developers outside of the companies that created these digital applications were often required to obtain a large amount of fully-labeled data. Fully-labeled data often requires a significant amount of time and resources to develop. In particular, building a sequence tagger that plays a key role in language understanding to extract entities and semantic roles requires a large amount of fully-labeled data, which often blocks 3rd parties from being able to quickly bootstrap new domains into a system in order to build language understanding experiences for their own applications.

There is typically no system or method that allows a third party developer to build language understanding models for another party's application without requiring a large amount of fully-labeled data. While previous systems have attempted to improve weakly supervised training of sequence taggers by exploiting search logs, these systems and methods have failed to incorporate partially labeled crowd-sourced data for a specific application into a probabilistic model framework and instead require the use of some fully-labeled crowd-sourced data. The systems and method disclosed herein are able to train a sequence tagger by utilizing both partially labeled crowd-sourced data for a specific application and partially labeled data from search logs. Accordingly, the systems and methods as disclosed herein allow a third party developer to build language understanding models for another party's application without requiring any fully-labeled data. In other words, the systems and methods as disclosed herein enable 3rd parties to build language understanding models in "Intent as a Service" IaaS platform, which allows third party developers to build language understanding models easily from training data.

The ability of the systems and methods described herein to train a sequence tagger by utilizing both partially labeled crowd-sourced data for a specific application and partially labeled data from search logs provides for a more accurate sequence tagging system, a more reliable sequence tagging system, and a more efficient sequence tagging system. Further, the ability of the systems and methods described herein to train a sequence tagger by utilizing both partially labeled crowd-sourced data for a specific application and partially labeled data from search logs reduces the time and resources necessary to build language understanding models for an application.

FIG. 1 generally illustrates an example of a system 100 for training a sequence tagger. Sequence taggers are designed to classify (also referred to as labeling or tagging herein) a wide variety of different inputs utilizing machine learning techniques. The inputs may be any sequence of data that needs to be clustered or classified, such as queries, search queries, genome sequences, and etc. In the illustrated example, the sequence tagger (also referred to as a sequence tagging system herein) is a conditional random field model 102. Other types of sequence taggers include neural networks. Conditional random fields (CRFs) 102, unlike neural networks, can achieve high accuracy without any tuning Therefore, CRFs are the most widely used machine learning technique applied to sequence tagging problems. A CRF 102 receives an input signal 104, extract features from the input signal 104, determines model parameters for the features, and then outputs a classification 106 or tag 106 for each feature in the form of a probability for each classification state. However, before the CRF model 102 can classify an input signal 104, the model 102 has to be trained utilizing training data 107 similar to the input signal 104.

For example, in some embodiments, the CRFs 102 are built to be language understanding models from the training data 107. As discussed above, previously utilized CRFs required large amounts of fully-labeled data as training data to build a language understanding model. Obtaining large amounts of fully-labeled data requires a significant amount time, money, and other resources and therefore often prevented other developers from building language understanding models to work with known highly complex language understanding applications, such as digital assistant applications. However, system 100 utilizes a constrained lattice system 111 for training the sequence tagger system, such as the CRF 102. The constrained lattice system 111 provides a system for training the sequence tagger utilizing only partially labeled data as training data 107. Further, unlike previously utilized training systems, the constrained lattice system 111 provides training data 107 from two different data sources.

The constrained lattice system 111 obtains two different kinds of partially labeled training data 107. The constrained lattice system 111 obtains the two different kinds of partially labeled data from any suitable sources for partially labeled data. In some embodiments, the two different kinds of partially labeled data are obtained from two different sources of partially labeled data. In additional embodiments, the first kind of partially labeled data is task specific unlike the second kind of partially labeled data that is not task specific data. In some embodiments, the constrained lattice system 111 obtains partially labeled crowd-sourced data 110 for a specific application and partially labeled search log data 108. Previously utilized training systems have utilized partially labeled search log data as training data; however, these previously utilized training systems required the partially labeled search log data to be combined with fully-labeled manual data. In contrast, the constrained lattice system 111 does not require the use of any fully-labeled data.

Any suitable method for obtaining partially labeled data 110 may be utilized by the system 100. In some embodiments, any suitable method for obtaining partially labeled crowd-sourced data 110 for a specific application may be utilized by the system 100. In some embodiments, the partially labeled crowd-source data is obtained by utilizing a crowd-sourcing approach to gather annotation data. In some embodiments, the same query can be sent to two or more human annotators and, thus, this approach allows multiple annotations of the query. For example, a simple rule may be applied to automatically tag the unambiguous tags, for example, <date>, <time> and <media_type>. As a result, in these embodiments, the human annotator doesn't have to fully assess a given query for annotation. Instead, in these embodiments, the human annotator can focus on more challenging tags such as <movie_title> and <person_name>.

Figure 2:
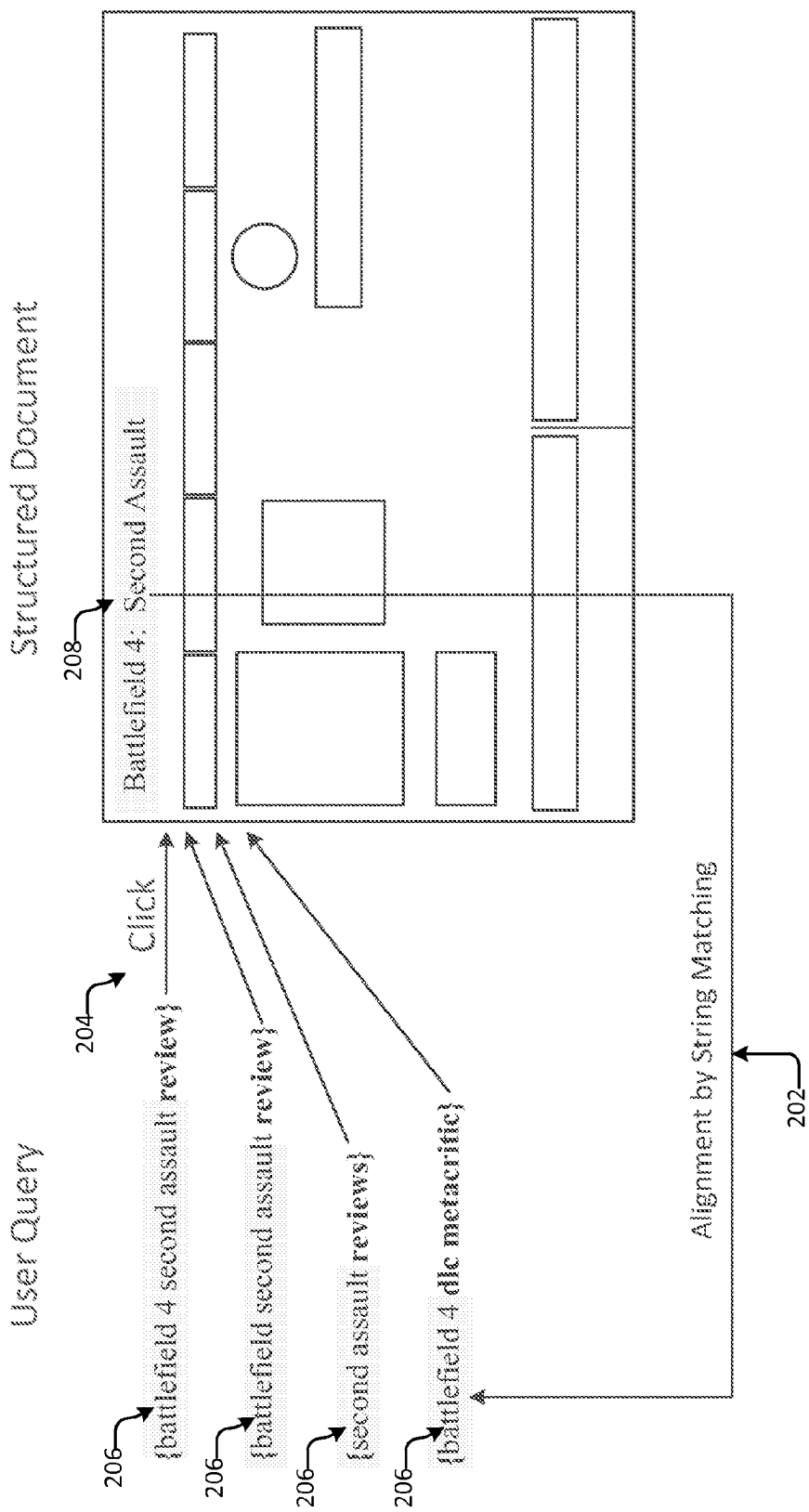
FIG. 2 is a schematic diagram illustrating an example of applying a string-based alignment algorithm to click-through data from a commercial database to align semantic tags with a query-knowledge click graph.

In some embodiments, any suitable system or method for obtaining partially labeled search log data 108 may be utilized by the system 100. In some embodiments, the partially labeled search log data 108 is automatically obtained by exploiting the large amounts of unlabeled data from commercial search engines by system 100. In these embodiments, a query-knowledge click graph is automatically constructed from click-through data by utilizing linking query-click logs and knowledge extraction. For example, a movie database can be easily extracted from a structured webpage like IMDB.com, and a general knowledge graph such as Freebase and Wikipedia is publicly available. Once a query-knowledge click graph is constructed, a string-based alignment algorithm can be applied to the query-knowledge click graph to align the query with semantic tags. FIG. 2 illustrates an example of applying a string-based alignment algorithm 202 to align semantic tags 208 with a query input value 206 on the query-knowledge click graph 204. Next, in these embodiments, less-confident alignments are removed due to the ambiguity of natural language, and knowledge and string matching algorithm and the high-confident alignments are kept for partial labeling to ensure that automatically obtained partially labeling process doesn't overgeneralize from misalignment. Any suitable system or method for automatically obtaining partially labeled search data by exploiting the large amounts of unlabeled data from commercial search engines may be utilized by the system 100.

Figure 3:
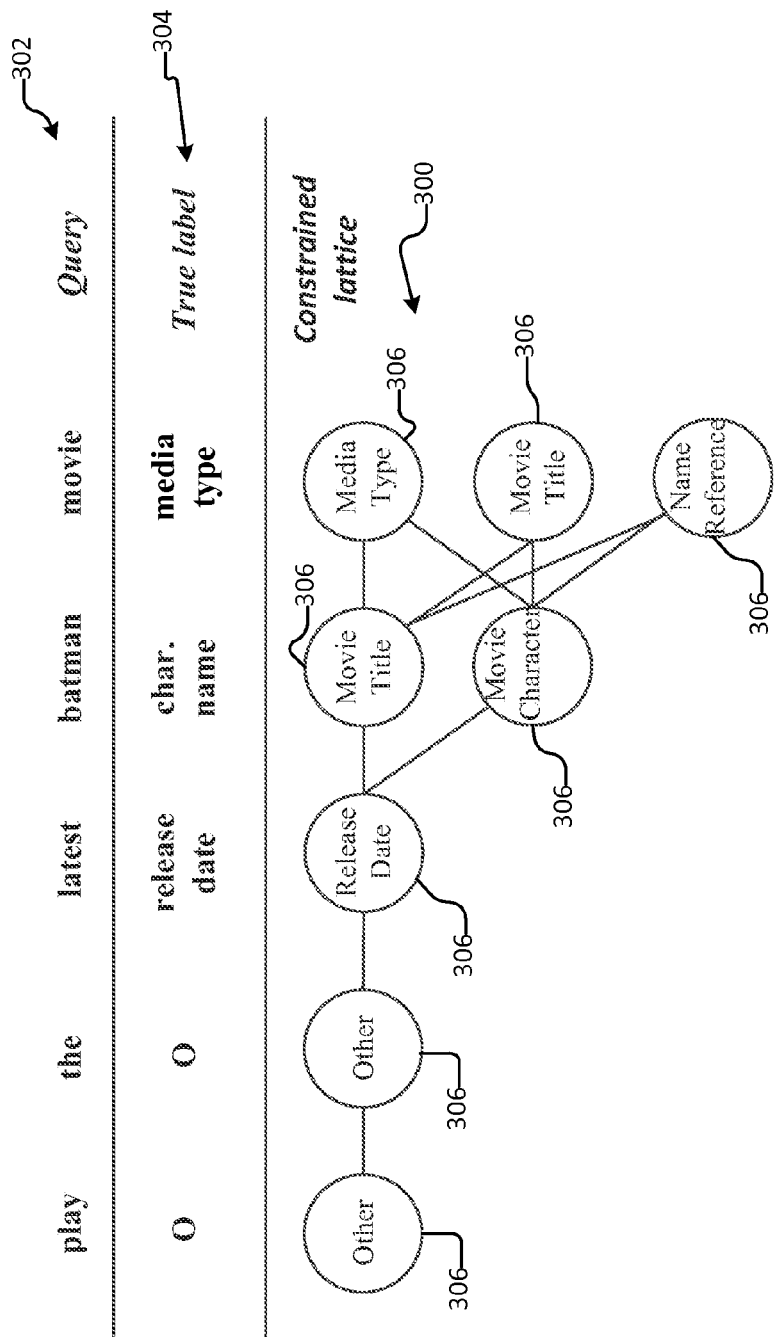
FIG. 3 is a schematic diagram illustrating an example of a constrained lattice created from the query "play the latest batman movie".

Once the constrained lattice system 111 has obtained the two different kinds of partially labeled data, the constrained lattice system 111 merges the two different kinds of partially labeled data 110 into a constrained lattice utilizing a merge mechanism 112. In some embodiments, once the constrained lattice system 111 has obtained the partially labeled crowd-sourced data 110 for a specific application and the partially labeled search log data 108, the constrained lattice system 111 merges the partially labeled crowd-sourced data 110 for a specific application and the partially labeled search log data 108 into a constrained lattice utilizing a merge mechanism 112. FIG. 3 illustrates an example of a constrained lattice 300 created from the query "play the latest batman movie" 302. FIG. 3 also illustrates the true label 304 for the query 302. In the constrained lattice, each input value (such as a word for a language understanding model) can have more than one admissible tag (also referred to as a label or classification herein) with confidence score. The admissible tags are referred to as candidate tags 306 herein and are represented as nodes on the constrained lattice 300. In contrast, a traditional training system assumes only one valid tag per input.

The lattice is constrained because each input value, such as a word, has a set of allowed candidate tag types (also referred to as allowed label types herein) and because the plurality of candidate tags is structured. For example, Tom Hanks may have the allowed tag types of "actor" and "director." Any suitable candidate tag type maybe utilized by system 100. The candidate tags are structured because certain candidate tags types cannot follow certain other candidate tag types. For example, in some embodiments, the candidate tag types are structured through the use of an IOB format. For example, in some embodiments, a movie name candidate tag type cannot follow a music name candidate tag types. This structure is exemplary only and is not meant to be limiting. Any suitable candidate tag structure may be utilized by system 100. In the case of missing or uncertain tag, the merge mechanism 112 opens all possible tags defined in schema in the constrained lattice. A schema is a label system for a specific task. For example, in an alarm schema, the following labels may be available: alarm state, duration, position reference, recurring date, start date, start time and title.

A first-order CRF parametrized by $\theta \in \mathbb{R}^d$ defines a conditional probability of a label sequence $y = y_1 \ldots y_n$ given an observation label sequence $x = x_1 \ldots x_n$ as follows:

$$p_\theta(y|x) = \frac{\exp(\theta^T \Phi(x, y))}{\sum_{y' \in y(x)} \exp(\theta^T \Phi(x, y'))} \quad \text{EQ \#1}$$

where,
p is a probability function,
$\Phi$ is a feature function,
$\theta$ is a parameter vector,
T is a transpose,
x is the input query,
y is a tag,
y' is a possible tag (or is a temporary variable for marginalization),
y(x) is the set of all possible label sequences for x, and
$\Phi(x,y) \in \mathbb{R}^d$ is a global feature function that decomposed into local feature functions $\Phi(x,y) = \sum_{j=1}^n \phi(x, j, y_{j-1}, y_j)$ by the first-order Markovian assumption.

Given fully-labeled sequences $\{x^{(i)}, y^{(i)}\}_{i=1}^n$ the standard training method is to find $\theta$ that maximize the log likelihood of the label sequences under the model with $l_2$-regularization:

$$\theta^* = \underset{\theta \in \mathbb{R}^d}{\arg\max} \sum_{i=1}^N \log p_\theta(y^{(i)}|x^{(i)}) - \frac{\lambda}{2} \|\theta\|^2 \quad \text{EQ \#2}$$

where,
arg max is an argument of the maximum,
$\mathbb{R}$ is a real valued vector,
$\theta^*$ is an optimal parameter,
N is a number of training examples,
i is a training example index,
$\lambda$ is the parameter dictating the strength of the regularization term
d is a dimension of parameter.

However, the merge mechanism 112 does not have fully-labeled sequences. Instead the merge mechanism 112 for each token x in sequence $x_1 \ldots x_n$ has the following two sources of label information:
a set of allowed label types $j(x_j)$ (label dictionary); and
a label $\tilde{y}_j$ transferred from a source data (Optional: Transferred label), where
j is the index of training data, and
$\tilde{y}$ is a transferred label.
Accordingly, the merge mechanism 112 defines the constrained lattice $y(x_j, \tilde{y}_j) = y(x_j, \tilde{y}_j) \ldots y(x_n, \tilde{y}_n)$ where each position j is a set of allowed label types (also referred to as constraints herein) is given as:

$$y(x_j, \tilde{y}_j) = \begin{cases} \{\tilde{y}_j\} & \text{if } \tilde{y}_j \text{ is given} \\ y(x_j) & \text{other} \end{cases} \quad \text{EQ \#3}$$

where, y is above the mapping function.

In addition to these existing constraints, the merge mechanism 112 introduces constraints on the label structure. For example, some label types cannot follow certain other label types. The merge mechanism 112 incorporates these restrictions by disallowing invalid label type as a post-processing step in the form of:

$$y(x_j, \tilde{y}_j) \leftarrow y(x_j, \tilde{y}_j) \cap \overline{y}(x_{j-1}, \tilde{y}_{j-1}) \quad \text{EQ \#4}$$

where, $\overline{y}$ is a filter or mapping function, and $\overline{y}(x_{j-1}, \tilde{y}_{j-1})$ is the set of valid label types that can follow $y(x_{j-1}, \tilde{y}_{j-1})$.

After the two different types of partially labeled data, such as the partially labeled crowd-sourced data 110 for a specific application and the partially labeled search log data 108, are merged into a constrained lattice by the merge mechanism 112, the training mechanism 114 applies a training algorithm to estimate model parameters based on the constrained lattice. As such, the training mechanisms 114 applies a probabilistic confidence model to estimate model parameters for the candidate tags 306. In some embodiments, the training mechanism 114 defines the conditional probability over label lattices (also referred to as candidate tag lattices herein) for a given observation sequence x:

$$p_\theta(y(x, \tilde{y})|x) = \Sigma_{y \in y(x, \tilde{y})} p_\theta(y|x) \quad \text{EQ \#5}$$

The training mechanism 114 trains the probabilistic model utilizing a small of amount of held out data. The held out data is training data 107 that was not merged into the constrained lattice by the merge mechanism 112. Given a label dictionary $y(x_j)$ for every token type $x_j$ and training sequences $\{(x^{(i)}, \tilde{y}^{(i)})\}_{i=1}^N$ where $\tilde{y}^{(i)}$ is (possibly non-existent) transferred labels for $x^{(i)}$, the training mechanism 114 utilizes the following equation to find $\theta$ that maximizes the log likelihood of the label lattices:

$$\theta^* = \underset{\theta \in \mathbb{R}^d}{\operatorname{argmax}} \sum_{i=1}^N \log p_\theta(y(x^{(i)}, \tilde{y}^{(i)}) | x^i) - \frac{\lambda}{2} \|\theta\|^2 \quad \text{EQ \#6}$$

Because the objective is non-convex, the training mechanism 114 finds a local optimum with a gradient-based algorithm. The gradient of this objective at each example $x^{(i)}, \tilde{y}^{(i)}$ takes a form of:

$$\Sigma_{y \in y(x^{(i)}, \tilde{y})} p_\theta(y|x^{(i)}) \Phi(x^i, y) - \Sigma_{y \in y(x^{(i)})} p_\theta(y|x^{(i)}) \Phi(x^i, y) - \lambda \theta \quad \text{EQ \#7}$$

Equation #7 above is the same as the training equation typically utilized by first-order CRFs except for the first term. For example, EQ#7 as utilized by training mechanism 114 replaces $\Phi(x^1, y^1)$ with the expected value of features in the constrained lattice $y(x^{(i)}, \tilde{y})$.

Further, the training mechanism 114 defines an objective function based on the constrained lattice as:

$$L(\theta) = \Sigma_{i=1}^N p_\theta(\hat{\Gamma}(x^{(i)})|x^{(i)}; \theta) - \lambda \|\theta\|_2^2 \quad \text{EQ \#8}$$

wherein

Γ is the constrained lattice,

λ is a regularization factor,

L is a likelihood function, and

N is the number of training data.

The objective function minimizes the energy gap between the predicted tag sequence in the constrained lattice and a corresponding predicted tag sequence in an unconstrained lattice. The energy gas as utilized herein refers to the score difference between two states. The training algorithm determines or calculates an unconstrained lattice when calculating $(\Sigma_{y \in y(x^{(i)})} p_\theta(y|x^{(i)}) \Phi(x^i, y))$ in Equation #7. Accordingly, now that the CRF 102 is trained, the CRF receives an input signal 104 (such as a language query), extracts features from the input query 104, determines model parameters for each of the features utilizing the constrained lattice system 111 and then outputs a classification 106 (also referred to as a tag 106 or label 106 herein) for each feature in the form of a probability for each classification state.

Figure 4:
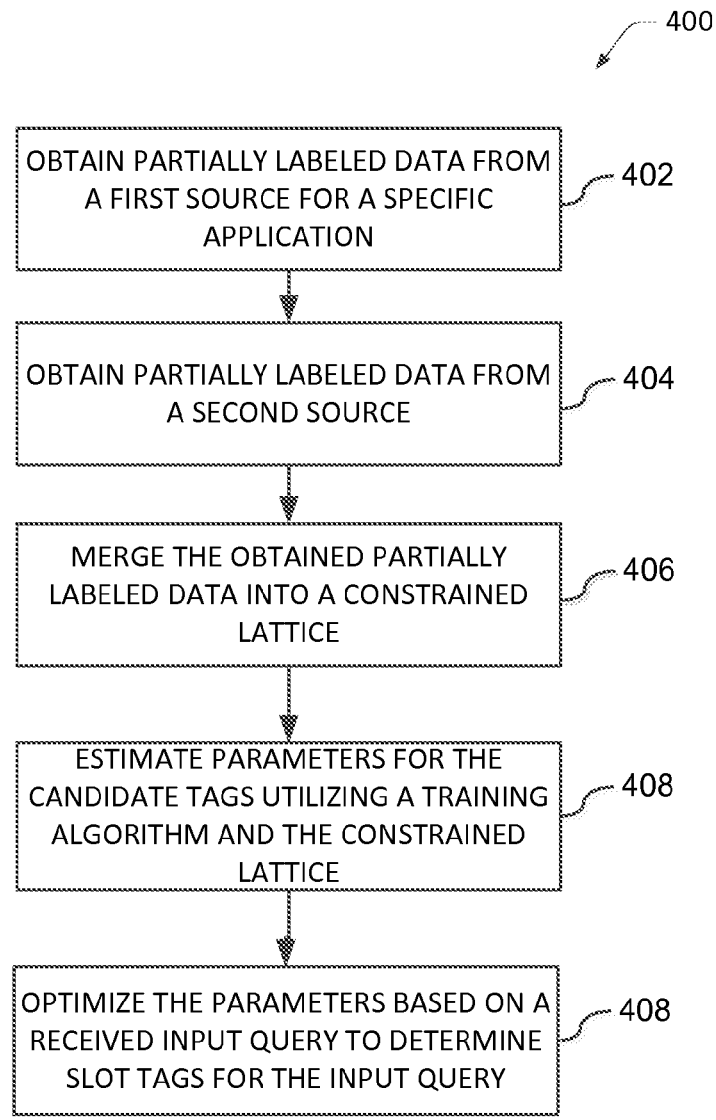
FIG. 4 is a flow diagram illustrating an example of a method for training a sequence tagger.

FIG. 4 is a flow diagram conceptually illustrating an example of a method 400 for training a sequence tagger, such as a CRF, utilizing machine learning techniques. In some embodiments, method 400 is performed by a constrained lattice system 111. Method 400 trains a sequence tagger by utilizing two different kinds of partially labeled data. Partially labeled data from any suitable source as would be known by a person of skill in the art may be utilized by method 400. In some embodiments, method 400 trains a sequence tagger by utilizing both partially labeled crowd-sourced data for a specific application and partially labeled data from search logs. As such, method 400 provides for a more accurate sequence tagging system, a more reliable sequence tagging system, and a more efficient sequence tagging system in comparison with sequence taggers that are trained by methods that utilize at least some fully-labeled data. Further, method 400 reduces the time and resources needed to build language understanding models for an application in comparison with sequence taggers that are trained by methods that require at least some fully-labeled data.

At operation 402, partially labeled data from a first source for a specific application is obtained. In some embodiments, at operation 402 partially labeled data for a specific application from crowd-sourced data is obtained. Any suitable method for obtaining partially labeled crowd-sourced data for a specific application may be utilized at operation 402. In some embodiments, the partially labeled crowd-source data is obtained at operation 402 by utilizing a crowd-sourcing approach to gather annotation data. In some embodiments, the same query can be sent to two or more human annotators and, thus, this approach allows multiple annotations of the query. As a result, in these embodiments, the human annotator doesn't have to fully assess a given query for annotation at operation 402.

Figure 5:
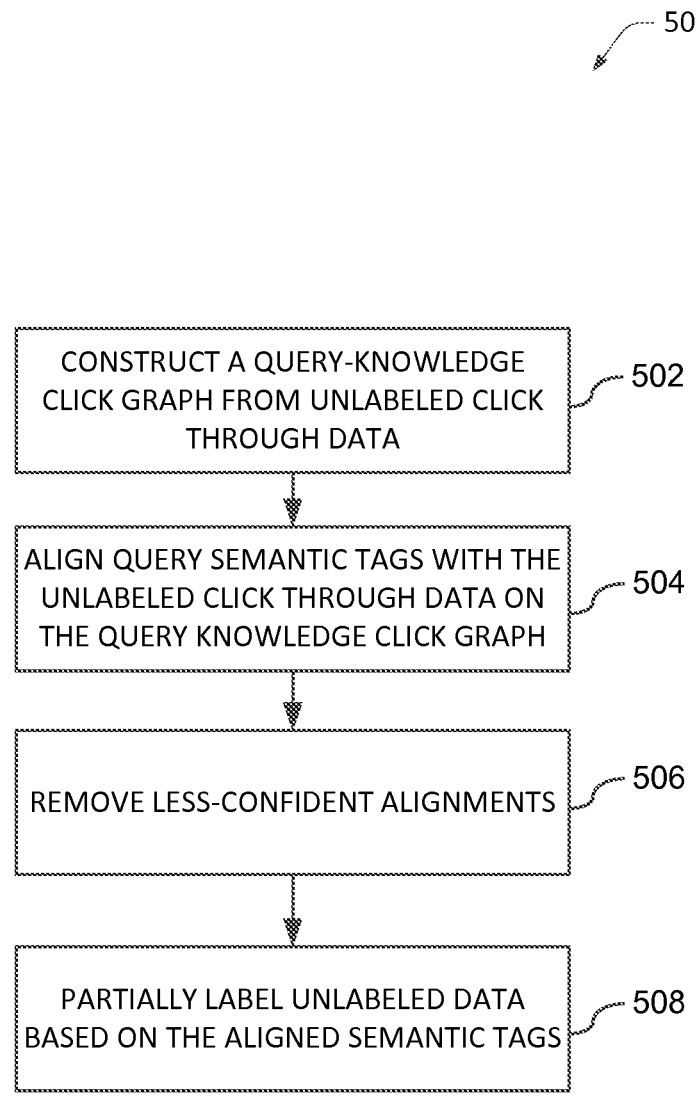
FIG. 5 is a flow diagram illustrating an example of a method for automatically generating partially labeled data from unlabeled data obtained from a commercial search engine.

At operation 404 partially labeled data is obtained from a second source. In some embodiments, at operation 404 partially labeled data is obtained from search logs. In some embodiments, the partially labeled data from the search logs is automatically obtained at operation 404 by exploiting large amounts of unlabeled data from commercial search engines as illustrated by method 500. FIG. 5 is a flow diagram conceptually illustrating an example of a method 500 for automatically generating partially labeled data from unlabeled data obtained from commercial search engines.

At operation 502 a query-knowledge click graph from unlabeled click-through data via linking query click logs and knowledge extraction is constructed. For example, a movie database can be easily extracted from a structured webpage like IMDB.com, and a general knowledge graph such as Freebase and Wikipedia is publicly available. A string-based alignment algorithm is applied to align query semantic tags with the unlabeled click-through data on the constructed query-knowledge click graph to form an aligned query-knowledge click graph at operation 504. Next, at operation 506 less-confident alignments are removed from the aligned query-knowledge click graph to form an updated aligned graph. The high-confident alignments on the query-knowledge click graph are kept for partial labeling at operation 506. Operation 506 is performed to ensure that automatic partial labeling process doesn't overgeneralize from misalignments due to the ambiguity of natural language. After operation 506, operation 508 is performed. At operation 508 the unlabeled click-through data is partially labeled based on the semantic tags aligned with the unlabeled click-through data on the updated aligned graph. Method 500 is just one example of a method for automatically obtaining partially labeled search data from commercial search engines that may be utilized by method 400. However, any suitable method for automatically obtaining partially labeled data from unlabeled data from commercial search engines may be utilized by method 400.

Once the two different types of partially labeled data, such as partially labeled data from the crowd-sourced data and from the search logs, has been obtained by operation 402 and 404, operation 406 is performed. At operation 406 the partially labeled data from the crowd-sourced data and the partially labeled data from the search logs are merged into a constrained lattice. Each input value (such as a word for language understanding model) within the constrained lattice can have more than one candidate tag with confidence score unlike traditional training methods that assumed only one valid tag per input. In the case of missing or uncertain tag, all possible tags defined in a schema in the constrained lattice are opened for the missing or uncertain tag in the constrained lattice. In order to create the constrained lattice at operation 406 each input value x in sequence $x_1 \ldots x_n$ has the following two sources of tag information:

a set of allowed tag types $y(x_j)$ (tag dictionary); and a tag $\tilde{y}_j$ transferred from a source data (Optional: Transferred tag).

Accordingly, the constrained lattice $y(x_j, \tilde{y}_j) = y(x_j, \tilde{y}_j) \ldots y(x_n, \tilde{y}_n)$ where each position j is a set of allowed tag types (also referred to as constraints herein) is given as Equation 3. In addition to these existing constraints, constraints on the tag structure also introduced to form the constrained lattice. For example, some tag types cannot follow certain other tag types. The constrained lattice is formed at operation 406 by incorporating these restrictions by disallowing invalid tag type as a post-processing step in the form of Equation #4, where $\bar{y}(x_{j-1}, \tilde{y}_{j-1})$ is the set of valid tag types that can follow $y(x_{j-1}, \tilde{y}_{j-1})$.

At operation 408 a training algorithm is run based on the constrained lattice to estimate model parameters. In some embodiment, the training algorithm applies a probabilistic confidence model to estimate model parameters for the candidate tags. In some embodiments, the training algorithm defines the conditional probability over candidate tag lattices for a given observation sequence x with Equation #5.

The training algorithm may train the probabilistic model utilizing a small of amount of held out data. Given a tag dictionary $y(x_j)$ for every tag type $x_j$ and training sequences $\{(x^{(i)}, \tilde{y}^{(i)})\}_{i=1}^N$ where $\tilde{y}^{(i)}$ is (possibly non-existent) transferred tags for $x^{(i)}$, the training algorithm may utilize Equation #6 to find θ. Equation #6 maximizes the log likelihood of the tag lattices. Because the objective is non-convex, the training algorithm finds a local optimum with a gradient-based algorithm. The gradient of this objective at each example $x^{(i)}$, $\tilde{y}^{(i)}$ is shown by Equation #7.

Further, the training algorithm utilized at operation 408 may define an objective function based on the constrained lattice with Equation #8. The training algorithm minimizes the energy gap between the predicted tag sequence in the constrained lattice and a corresponding predicted tag sequence in an unconstrained lattice.

Once a sequence tagger, such as a CRF, has been trained by method 400, the CRF can be applied to various tagging tasks. For example, the CRF may receive a query input, such as a language query. The CRF extracts features from the language query and then estimates language model parameters for each feature utilizing the constrained lattice and the training algorithm. Next, the CRF optimizes the language model parameters based on the query language. The CRF determines a tag (also referred to as label or classification) for each feature based on the optimized language parameters. The determined tags are output by the CRF as the result.

In some embodiments, a training system for a conditional random field is disclosed. This training system includes means for obtaining partially labeled data from crowd-sourced data for a specific application and means for obtaining partially labeled data from search logs. The training system further includes means for merging the partially labeled data from the crowd-sourced data and from the search logs into a constrained lattice and means for running a training algorithm based on the constrained lattice to estimate model parameters. Further, each word within the constrained lattice has a plurality of candidate tags with confidence scores. In some embodiments, the training system provides for a more accurate sequence tagger and a more reliable sequence tagger when compared to sequence taggers that are trained with at least some fully-labeled data.

In other embodiments, a system for building a language understanding model utilizing machine learning techniques is disclosed. The system includes means for obtaining partially labeled data from crowd-sourced data for a specific application and means for obtaining partially labeled data from search logs. The system further includes means for merging the partially labeled data from the crowd-sourced data and from the search logs into a constrained lattice and means for running a training algorithm based on the constrained lattice to estimate model parameters. Further, each word within the constrained lattice has a plurality of candidate tags with confidence scores. The constrained lattice is constrained because every word has a set of allowed candidate tag types and because the candidate tags are structured. Additionally, the language understanding model is a trained conditional random field.

In some embodiments a method for training a sequence tagger utilizing machine learning techniques is disclosed. The method includes obtaining partially labeled data from a first source for a specific application and obtaining partially labeled data from a second source. The second source is search logs. The method further includes merging the partially labeled data from the first source and from the search logs into a constrained lattice. Each input value within the constrained lattice has a plurality of candidate tags with confidence scores. The method additionally includes running a training algorithm based on the constrained lattice to estimate model parameters. The method provides for a more accurate sequence tagger and a more reliable sequence tagger in comparison to sequence taggers that are trained with at least some fully-labeled data. The sequence tagger may be a conditional random field. If input value in the constrained lattice has a missing or uncertain tag, the constrained lattice may assign all candidate tags from a schema to the input value. The constrained lattice may be constrained because every input value has a set of allowed candidate tag types and because the plurality of candidate tags is structured. The plurality of candidate tags may be structured because some candidate tags types cannot follow certain other candidate tag types. The training algorithm may minimize an energy gap between a candidate tag from the constrained lattice and a corresponding candidate tag from an unconstrained lattice. This method may provide a platform for building language understanding models without needing any fully-labeled data for the specific application. The partially labeled data from the search logs may be generated from unlabeled data from a commercial search engine by: constructing a query-knowledge click graph from unlabeled click-through data via linking query click logs and knowledge extraction; applying a string-based alignment algorithm to align semantic tags with the unlabeled click-through data on the query-knowledge click graph to form an aligned query-knowledge click graph; removing less-confident alignments from the aligned query-knowledge click graph to form an updated aligned graph; and partially labeling the unlabeled click-through data based on the semantic tags aligned with the unlabeled click-through data on the updated aligned graph.

In further embodiments, a training system for a conditional random field is disclosed. The training system comprises a computing device. The computing device includes a processing unit and a memory. The processing unit implements a constrained lattice system. The constrained lattice system is operable to obtain partially labeled data from crowd-sourced data for a specific application and to obtain partially labeled data from search logs. The constrained lattice system is further operable to merge the partially labeled data from the crowd-sourced data and from the search logs into a constrained lattice. Each word within the constrained lattice has a plurality of candidate tags with confidence scores. Additionally, the constrained lattice system is operable to run a training algorithm based on the constrained lattice to estimate model parameters. The partially labeled data from the search logs may be generated from unlabeled data from a commercial search engine. When a word in the constrained lattice has an uncertain tag, the constrained lattice may assign all candidate tags from a schema to the word. The constrained lattice may be constrained because each word has a set of allowed candidate tag types and because the plurality of candidate tags is structured. The plurality of candidate tags may be structured because some candidate tags types cannot follow certain other candidate tag types. The training algorithm may minimize an energy gap between a candidate tag from the constrained lattice and a corresponding candidate tag from an unconstrained lattice. The constrained lattice system may create a more accurate conditional random field and a more reliable conditional random field in comparison to conditional random fields that are trained with at least some fully-labeled data. The training system may build a language understanding model without needing to obtain any fully-labeled crowd-sourced data for the specific application. The constrained lattice system may be implemented on a mobile telephone, a smart phone, a tablet, a smart watch, a wearable computer, a personal computer, a desktop computer, a gaming system, and/or a laptop computer. The specific application maybe a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, and/or a calendaring application.

In additional embodiments, a system for building a language understanding model utilizing machine learning techniques is disclosed. The system comprises at least one processor and one or more computer-readable storage media including computer-executable instructions stored thereon. The computer-executable instructions are executed by the at least one processor. The computer-executable instructions cause the system to perform operations including obtaining partially labeled data from crowd-sourced data for a specific application and obtaining partially labeled data from search logs. The computer-executable instructions further cause the system to perform operations including merging the partially labeled data from the crowd-sourced data and from the search logs into a constrained lattice. Each word within the constrained lattice has a plurality of candidate tags with confidence scores. The constrained lattice is constrained because every word has a set of allowed candidate tag types and because the plurality of candidate tags is structured. Additionally, the computer-executable instructions cause the system to perform operations including running a training algorithm based on the constrained lattice to estimate model parameters. The language understanding model is a trained conditional random field.

FIGS. 6-9 and the associated descriptions provide a discussion of a variety of operating environments in which embodiments of the disclosure may be practiced. However, the devices and systems illustrated and discussed with respect to FIGS. 6-9 are for purposes of example and illustration and are not limiting of a vast number of computing device configurations that may be utilized for practicing embodiments of the disclosure, described herein.

Figure 6:
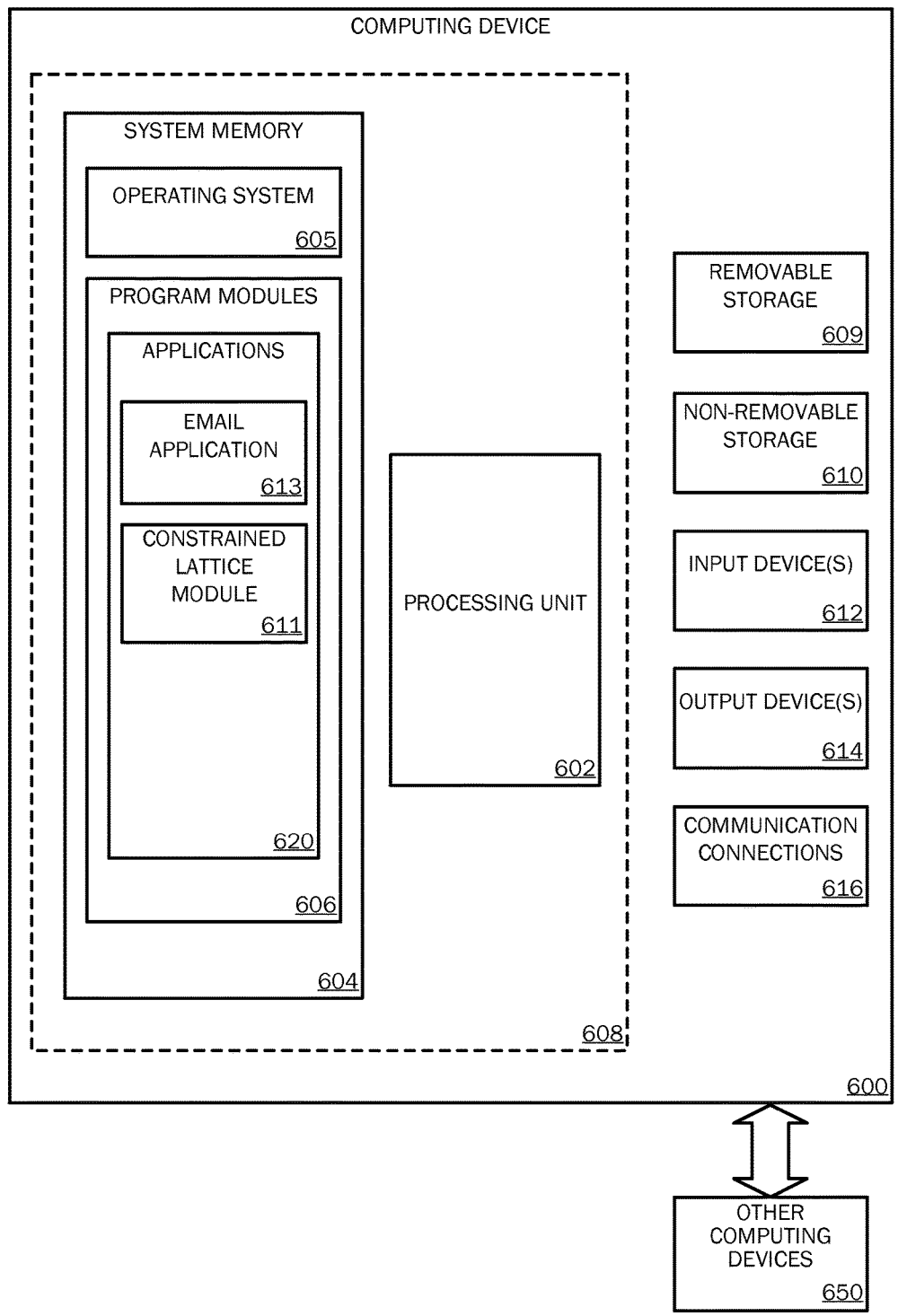
FIG. 6 is a block diagram illustrating example physical components of a computing device with which embodiments of the disclosure may be practiced.

FIG. 6 is a block diagram illustrating physical components (e.g., hardware) of a computing device 600 with which embodiments of the disclosure may be practiced. For example, the constrained lattice system or module 611 could be implemented by the computing device 600. In some embodiments, the computing device 600 is one of a mobile telephone, a smart phone, a tablet, a smart watch, a wearable computer, a personal computer, a desktop computer, a gaming system, a laptop computer, and etc. The computing device components described below may include computer executable instructions for a constrained lattice module 611 that can be executed to employ the method 400 and implement portions of the system 100 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. For example, partially labeled data obtained by the constrained lattice module 611 could be stored on any of the illustrated storage devices.

As stated above, a number of program modules and data files may be stored in the system memory 604. While executing on the processing unit 602, the program modules 606 (e.g., constrained lattice module 611, or email application 613) may perform processes including, but not limited to, performing method 400 and/or method 500 as described herein. For example, the processing unit 602 may implement a constrained lattice module 611. Other program modules that may be used in accordance with embodiments of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a calendaring application, etc. In some embodiment, the constrained lattice module 611 gathers partially labeled and/or unlabeled crowd-sourced data specific for one of the above referenced applications.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, RF transmitter, receiver, and/or transceiver circuitry; universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
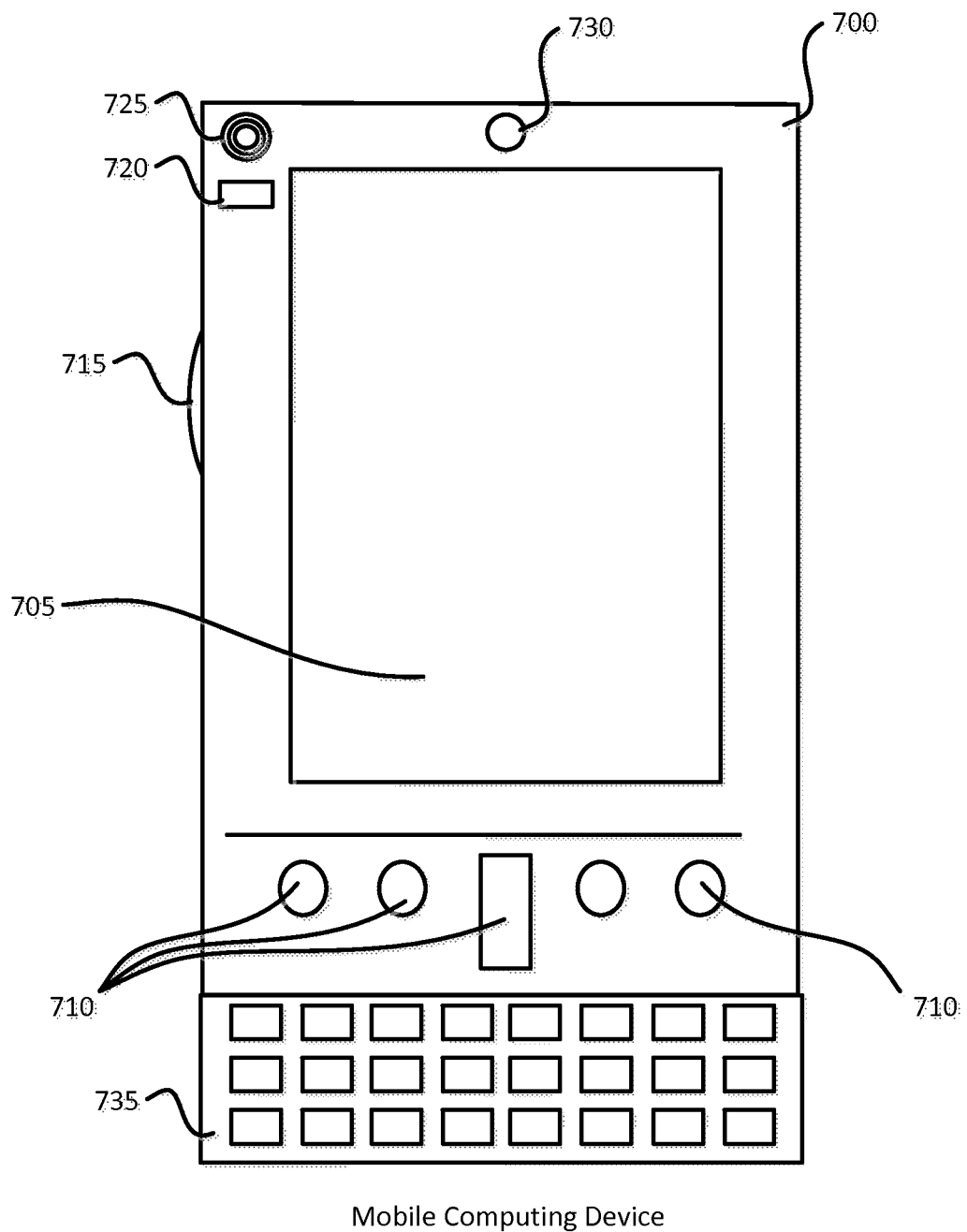
FIGS. 7A and 7B are simplified block diagrams of a mobile computing device with which embodiments of the present disclosure may be practiced.
Figure 7B:
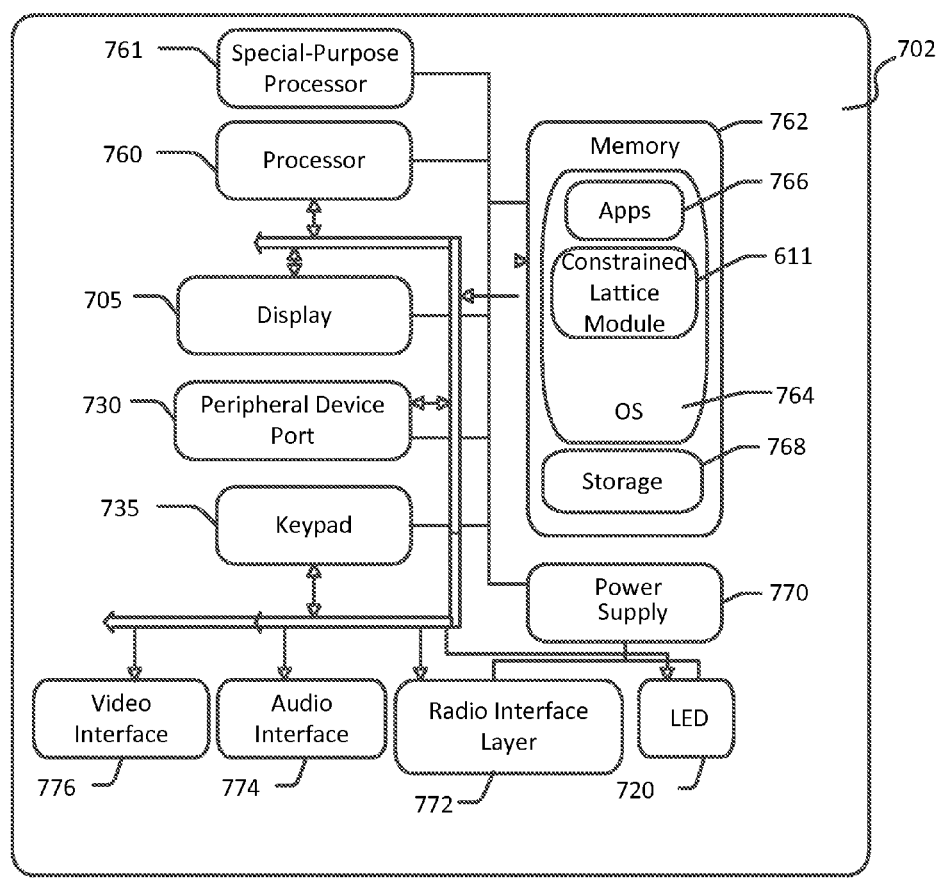

FIGS. 7A and 7B illustrate a mobile computing device 700, for example, a mobile telephone, a smart phone, wearable computer (such as a smart watch), a tablet personal computer, a laptop computer, and the like, with which embodiments of the disclosure may be practiced. With reference to FIG. 7A, one embodiment of a mobile computing device 700 suitable for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In addition to, or in place of a touch screen input device associated with the display 705 and/or the keypad 735, a Natural User Interface (NUI) may be incorporated in the mobile computing device 700. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various embodiments, the output elements include the display 705 for showing a graphical user interface (GUI). In embodiments disclosed herein, the various user information collections could be displayed on the display 705. Further output elements may include a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (e.g., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 and/or constrained lattice module 611 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
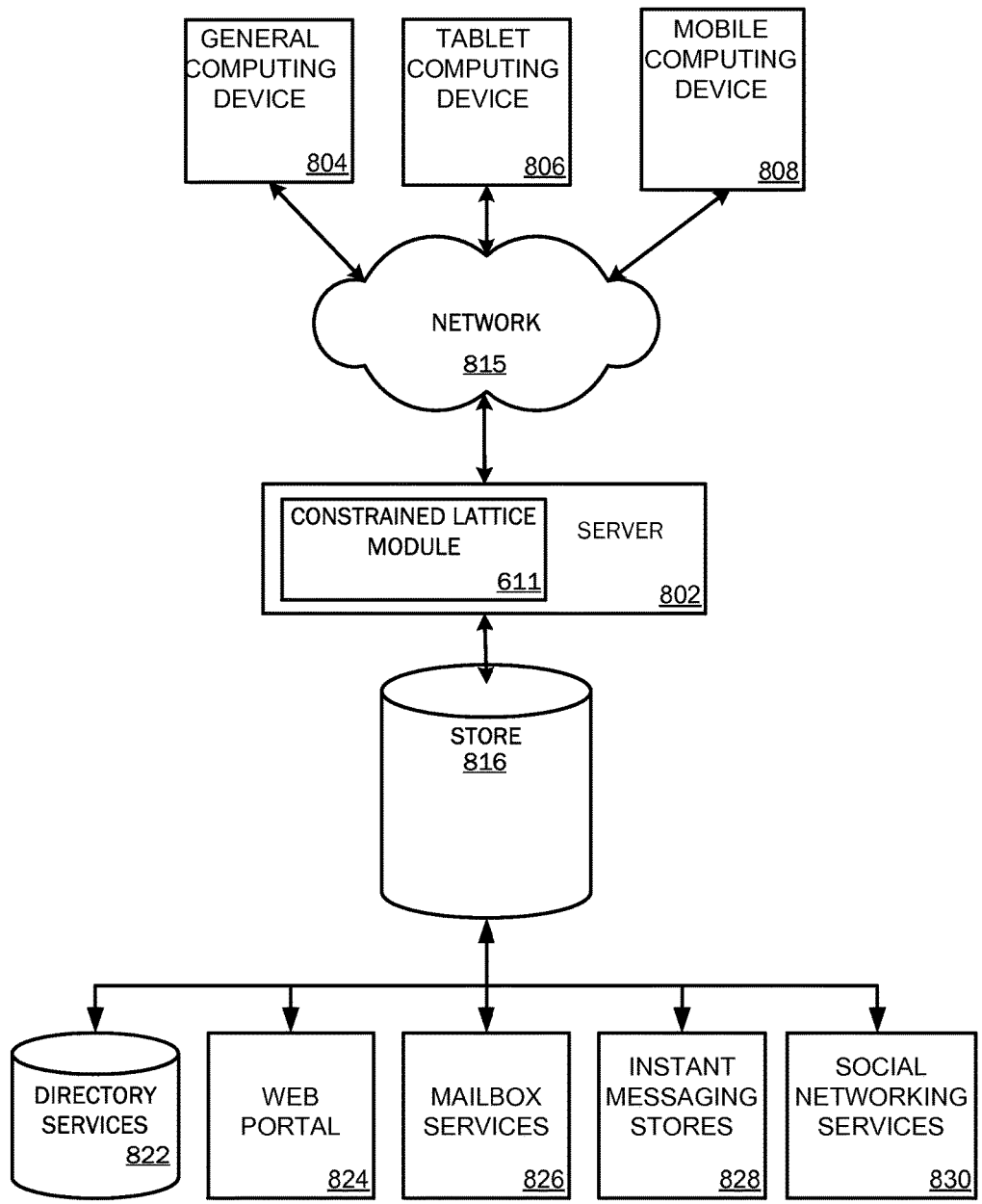
FIG. 8 is a simplified block diagram of a distributed computing system in which embodiments of the present disclosure may be practiced.

FIG. 8 illustrates one embodiment of the architecture of a system for processing data received at a computing system from a remote source, such as a general computing device 804, tablet 806, or mobile device 808, as described above. Content displayed at server device 802 may be stored in different communication channels or other storage types. For example, various documents may be stored using a directory service 822, a web portal 824, a mailbox service 826, an instant messaging store 828, or a social networking site 830. By way of example, the constrained lattice system may be implemented in a general computing device 804, a tablet computing device 806 and/or a mobile computing device 808 (e.g., a smart phone). Partially labeled crowd-sourced data, unlabeled crowd-sourced data, unlabeled search log data, and/or partially labeled search log data, may be obtained by the server device 802, which may be configured to implement the constrained lattice module 611, via the network 815. In some implementations, partially labeled or unlabeled data is periodically transmitted to the server device 802 and are stored in the store 816.

EXAMPLE 1

An experiment was conducted to compare a traditional CRF to the semi-supervised CRF trained utilizing the systems and/or methods disclosed herein. The traditional CRF was trained utilizing fully-labeled crowd-sourced data. The semi-supervised CRF was trained utilizing partially labeled crowd-sourced data for a specific application and partially labeled search log data as described in the systems and method disclosed herein. Both CRFs were built to create language understanding models. The two different CRFs were applied to various sequence tagging tasks utilizing an Xbox One entertainment search. Hundreds of queries relating to movies, music, and games were evaluated. Each query was evaluated by each CRF. The accuracy of each CRF's results were monitored and recorded as illustrated in Table 1 below. The accuracy score provided in Table 1 below is defined as the harmonic mean of precision and recall. An accuracy score of 100 is the best score possible, while a score of 0 is the worst score possible.

TABLE 1

Accuracy of CRF results in an Xbox One Entertainment Search.

| CRF Type | Movie Search Accuracy | Music Search Accuracy | Game Search Accuracy |
| --- | --- | --- | --- |
| Traditional CRF | 74.21 | 37.13 | 68.58 |
| Semi-supervised CRF | 77.23 | 44.55 | 76.89 |

Table 1 illustrates that the semi-supervised CRF trained utilizing only partially labeled data was more accurate and more reliable at returning proper search results in all three categories than the traditional CRF. As discussed above, the semi-supervised CRF requires less time, money, and other resources to build. Accordingly, the training systems and method disclosed herein build a more accurate and a more reliable model, such as a language understanding model, utilizing less time, money, and other resources when compared to traditional CRFs that require the use of at least some fully-labeled training data.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary embodiments were provided so that this disclosure was thorough and complete and fully conveyed the scope of the other possible embodiments to those skilled in the art. For example, aspects of the various embodiments disclosed herein may be modified and/or combined without departing from the scope of this disclosure.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:

1. A training system for a conditional random field, the training system comprising:
   a computing device including a processing unit and a memory, the processing unit implementing a constrained lattice system, the constrained lattice system is operable to:
   obtain partially labeled data from crowd-sourced data for a specific application;
   obtain partially labeled data from search logs;
   merge the partially labeled data from the crowd-sourced data and from the search logs into a constrained lattice, wherein each word within the constrained lattice has a plurality of candidate tags with confidence scores;
   run a training algorithm based on the constrained lattice to estimate model parameters.

2. The training system of claim 1, wherein the partially labeled data from the search logs is generated from unlabeled data from a commercial search engine.

3. The training system of claim 1, wherein when a word in the constrained lattice has an uncertain tag, the constrained lattice assigns all candidate tags from a schema to the word.

4. The training system of claim 1, wherein the constrained lattice is constrained because each word has a set of allowed candidate tag types and because the plurality of candidate tags is structured.

5. The training system of claim 4, wherein the plurality of candidate tags is structured because some candidate tags types cannot follow certain other candidate tag types.

6. The training system of claim 1, wherein the training algorithm minimizes an energy gap between a candidate tag from the constrained lattice and a corresponding candidate tag from an unconstrained lattice.

7. The training system of claim 1, wherein the constrained lattice system creates a more accurate conditional random field and a more reliable conditional random field in comparison to conditional random fields that are trained with at least some fully-labeled data.

8. The training system of claim 1, wherein the training system builds a language understanding model without needing to obtain any fully-labeled crowd-sourced data for the specific application.

9. The training system of claim 1, wherein the constrained lattice system is implemented on at least one of:
   a mobile telephone;
   a smart phone;
   a tablet;
   a smart watch;
   a wearable computer;
   a personal computer;
   a desktop computer;
   a gaming system; and
   a laptop computer.

10. The training system of claim 1, wherein the specific application is at least one of:
    a digital assistant application;
    a voice recognition application;
    an email application;
    a social networking application;
    a collaboration application;
    an enterprise management application;
    a messaging application;
    a word processing application;
    a spreadsheet application;
    a database application;
    a presentation application;
    a contacts application;
    a gaming application;
    an e-commerce application;

an e-business application;
a transactional application;
an exchange application; and
a calendaring application.

11. A method for training a sequence tagger utilizing machine learning techniques, the method comprising:
    obtaining partially labeled data from a first source for a specific application;
    obtaining partially labeled data from a second source, wherein the second source is search logs;
    merging the partially labeled data from the first source and from the search logs into a constrained lattice,
    wherein each input value within the constrained lattice has a plurality of candidate tags with confidence scores, and
    running a training algorithm based on the constrained lattice to estimate model parameters,
    wherein the method provides for a more accurate sequence tagger and a more reliable sequence tagger in comparison to sequence taggers that are trained with at least some fully-labeled data.

12. The method of claim 11, wherein the sequence tagger is a conditional random field.

13. The method of claim 11, wherein when an input value in the constrained lattice has a missing or uncertain tag, the constrained lattice assigns all candidate tags from a schema to the input value.

14. The method of claim 11, wherein the constrained lattice is constrained because every input value has a set of allowed candidate tag types and because the plurality of candidate tags is structured.

15. The method of claim 14, wherein the plurality of candidate tags is structured because some candidate tags types cannot follow certain other candidate tag types.

16. The method of claim 11, wherein the training algorithm minimizes an energy gap between a candidate tag from the constrained lattice and a corresponding candidate tag from an unconstrained lattice.

17. The method of claim 11, wherein the method provides a platform for building language understanding models without needing any fully-labeled data for the specific application.

18. The method of claim 11, wherein the specific application is at least one of:
    a digital assistant application;
    a voice recognition application;
    an email application;
    a social networking application;
    a collaboration application;
    an enterprise management application;
    a messaging application;
    a word processing application;
    a spreadsheet application;
    a database application;
    a presentation application;
    a contacts application;
    a gaming application;
    an e-commerce application;
    an e-business application;
    a transactional application;
    an exchange application; and
    a calendaring application.

19. The method of claim 11, wherein the partially labeled data from the search logs is generated from unlabeled data from a commercial search engine by:
    constructing a query-knowledge click graph from unlabeled click-through data via linking query click logs and knowledge extraction;
    applying a string-based alignment algorithm to align semantic tags with the unlabeled click-through data on the query-knowledge click graph to form an aligned query-knowledge click graph;
    removing less-confident alignments from the aligned query-knowledge click graph to form an updated aligned graph; and
    partially labeling the unlabeled click-through data based on the semantic tags aligned with the unlabeled click-through data on the updated aligned graph.

20. A system for building a language understanding model utilizing machine learning techniques, the system comprising:
    at least one processor; and
    one or more system memories including computer-executable instructions stored thereon that, responsive to execution by the at least one processor, cause the system to perform operations including:
        obtaining partially labeled data from crowd-sourced data for a specific application;
        obtaining partially labeled data from search logs;
        merging the partially labeled data from the crowd-sourced data and from the search logs into a constrained lattice,
        wherein each word within the constrained lattice has a plurality of candidate tags with confidence scores, and
        wherein the constrained lattice is constrained because every word has a set of allowed candidate tag types and because the plurality of candidate tags is structured; and
        running a training algorithm based on the constrained lattice to estimate model parameters,
    wherein the language understanding model is a trained conditional random field.

* * * * *